United States Patent [19]
Ueki et al.

[11] Patent Number: 5,440,656
[45] Date of Patent: Aug. 8, 1995

[54] WAVEGUIDE TYPE OPTICAL COMPONENT HAVING OPTICAL COUPLING SECTIONS WITH DIFFERENT COUPLING EFFICIENCIES

[75] Inventors: Ken Ueki; Takeo Shimizu; Hisaharu Yanagawa, all of Tokyo, Japan

[73] Assignee: The Furukawa Electric Co., Ltd., Tokyo, Japan

[21] Appl. No.: 142,309

[22] PCT Filed: Mar. 17, 1993

[86] PCT No.: PCT/JP93/00314
§ 371 Date: Nov. 16, 1993
§ 102(e) Date: Nov. 16, 1993

[87] PCT Pub. No.: WO93/19389
PCT Pub. Date: Sep. 30, 1993

[30] Foreign Application Priority Data
Mar. 18, 1992 [JP] Japan ................... 4-062032

[51] Int. Cl.⁶ ............................................. G02B 6/00
[52] U.S. Cl. ..................................................... 385/30
[58] Field of Search ..................... 385/11, 14, 15, 16, 385/27, 30, 40

[56] References Cited
U.S. PATENT DOCUMENTS

| | | | |
|---|---|---|---|
| 4,673,270 | 6/1987 | Gordon | 385/30 |
| 4,679,894 | 7/1987 | Pavlath | 385/30 |
| 5,048,906 | 9/1991 | Okayama et al. | 385/40 |
| 5,185,831 | 2/1993 | Kawashima | 385/11 |

FOREIGN PATENT DOCUMENTS

| | | |
|---|---|---|
| 3-2806 | 1/1991 | Japan . |
| 3-81706 | 4/1991 | Japan . |
| 4-19713 | 1/1992 | Japan . |

*Primary Examiner*—Akm E. Ullah
*Attorney, Agent, or Firm*—Frishauf, Holtz, Goodman & Woodward

[57] ABSTRACT

A waveguide type optical component, as an optical coupler/splitter, is provided, which is capable of reducing the dependence of the efficiency of optical coupling between optical waveguides on wavelength and of permitting reduction in size. The optical component has a first optical coupling section (A) including optical waveguides (A1, A2) sharing the same propagation constant, a second optical coupling section (B) including optical waveguides (B1, B2) having different propagation constants, and a third optical coupling section (A') including optical waveguides (A'1, A'2) sharing the same propagation constant. Associated ones of the optical waveguides (A1, B1, A'1; A2, B2, A'2) are connected in series with each other.

9 Claims, 1 Drawing Sheet

WAVEGUIDE TYPE OPTICAL COMPONENT HAVING OPTICAL COUPLING SECTIONS WITH DIFFERENT COUPLING EFFICIENCIES

TECHNICAL FIELD

The present invention relates to a waveguide type optical component, and more particularly, to a waveguide type optical component having an efficiency of optical coupling between optical waveguides which is less dependent on the wavelength of light.

BACKGROUND ART

An optical coupler/splitter for branching and coupling optical signals between optical transmission lines is an essential device for configuring an optical communication network. To improve operation reliability of an optical device and make it compact in size, it is known to use, as an optical coupler/splitter, a directional coupler which has an optical coupling section consisting of two optical waveguides arranged in parallel to each other so as to achieve evanescent-field coupling therebetween. The waveguide type directional coupler, however, is disadvantageous in that its efficiency of optical coupling between optical waveguides heavily depends on the wavelength of light. In an optical coupler/splitter, high dependence of the coupling efficiency on wavelength makes it difficult to branch or couple optical signals at a specified ratio, if the wavelength of an optical signal fluctuates due to some reason, or to provide a general-purpose optical coupler/splitter suited for both optical communication networks which are different in working wavelength (e.g., 1.3 $\mu$m and 1.55 $\mu$m).

To reduce the dependence of the coupling efficiency in a waveguide type directional coupler on wavelength, it has been suggested that the working principle of a Mach-Zehnder interferometer be applied. Typically, this waveguide type optical component has two optical coupling sections, and a phase-shifting section which is provided between the two optical coupling sections and which consists of a curved optical waveguide and a linear optical waveguide. A first optical waveguide is configured by the optical waveguides of one side of the two optical coupling sections and the curved optical waveguide of the phase-shifting section connected between them, and a second optical waveguide of the optical component is configured by the optical waveguides of the other side of two optical coupling sections and the linear optical waveguide of the phase-shifting section connected between them. The optical component according to the above-mentioned suggestion is designed so that the efficiency of coupling between the first optical waveguide and the second optical waveguide stays almost constant in a certain light wavelength range by setting the path difference between the two optical waveguides of the phase-shifting section to a required value and by adjusting parameters (e.g., coupling section length and waveguide space) of each coupling section. However, setting the path difference between the two optical waveguides of the phase-shifting section to a required value unavoidably results in an increased length of the phase-shifting section because it is difficult to decrease the radius of the curvature of the curved optical waveguide. For this reason, the optical component suggested above is disadvantageous in that the optical component becomes large in size. If curved waveguides are used for the two waveguides of the phase-shifting section, then the resulting waveguides will be even longer, causing inconvenience.

It is also known that an optical component, which includes two linear optical waveguides having different propagation constants, is used to eliminate the dependence of the coupling efficiency of a directional coupler on wavelength. While this optical component is advantageous in that the optical waveguides can be made shorter because the coupling sections are linear, it is disadvantageous in that the coupling efficiency considerably varies with changes in light wavelength, and therefore, the flatness of the coupling efficiency (in other words, the dependence of the coupling efficiency on wavelength) is worse than that of the optical component suggested above.

SUMMARY OF THE INVENTION

An object of the present invention is to provide a waveguide type optical component which permits a reduced size and which is capable of reducing the dependence of coupling efficiency on wavelength.

To fulfill the above-mentioned object, a waveguide type optical component according to the present invention comprises a first optical coupling section including two optical waveguides having the same propagation constant, and a second optical coupling section including two optical waveguides having different propagation constants. Each of the optical waveguides of the first optical coupling section and a corresponding one of the optical waveguides of the second optical coupling section are connected in series with each other, and the two optical waveguides of each of the first and second optical coupling sections are linearly configured and disposed so as to achieve evanescent-field coupling between the two optical waveguides.

Preferably, the waveguide type optical component further includes a third optical coupling section including two optical waveguides having the same propagation constant. Each of the optical waveguides of the first optical coupling section and a corresponding one of the optical waveguides of the second optical coupling section are connected in series with each other on one side of the second optical coupling section, and each of the optical waveguides of the second optical coupling section and a corresponding one of the optical waveguides of the third optical coupling section are connected in series with each other on the other side of the second optical coupling section. The optical waveguides of the optical coupling sections are preferably made of silica. Further, the two optical waveguides of the second optical coupling section have at least different widths or heights or are made of materials which have different refractive indices.

As described above, according to the present invention, the waveguide type optical component is equipped with the first optical coupling section consisting of two optical waveguides which share the same propagation constant and the second optical coupling section consisting of two waveguides which have different propagation constants, and corresponding ones of the optical waveguides of the first and second optical coupling sections are connected in series; therefore, by properly setting the coefficient of coupling between the optical waveguides of the optical coupling sections and the propagation constant difference between the optical waveguides of the second optical coupling section, the efficiency of optical coupling (the optical coupling efficiency of the whole optical component) between one optical waveguide of the optical component, composed of the optical waveguides of one side of the two optical coupling sections, and the other optical waveguide of the optical component, composed of the optical waveguides of the other side of the two optical coupling sections, can be set to a desired value within a range of 0 to 50%, and the dependence of the coupling efficiency on wavelength can be significantly reduced. Furthermore, since the two optical waveguides of each of the optical coupling sections are configured linearly, the waveguide type optical component according to the present invention can be made smaller.

Additionally, from the view point of designing an optical circuit, the optical component having an optical coupling efficiency, which can be set to a desired value within a range of 50 to 100%, is equivalent to the optical component having an optical coupling efficiency, which can be set to a desired value within a range of 0 to 50%. Hence, according to the present invention, it is actually possible to provide an optical component having an optical coupling efficiency which can be set to a value within a range of 0 to 100%.

Preferably, according to a particular aspect of the present invention wherein the first and third optical coupling sections, each including optical waveguides which have the same propagation constant, are provided on both sides of the second optical coupling section including optical waveguides which have different propagation constants, the setting of the coefficient of coupling between the optical waveguides of the optical component can be further optimized by properly setting the coefficient of coupling between the optical waveguides of the third optical coupling section. Further, the optical waveguides of the second optical coupling section can be furnished with different propagation constants simply by setting the widths or the like of the two optical waveguides to different values.

DETAILED DESCRIPTION

Figure 2:
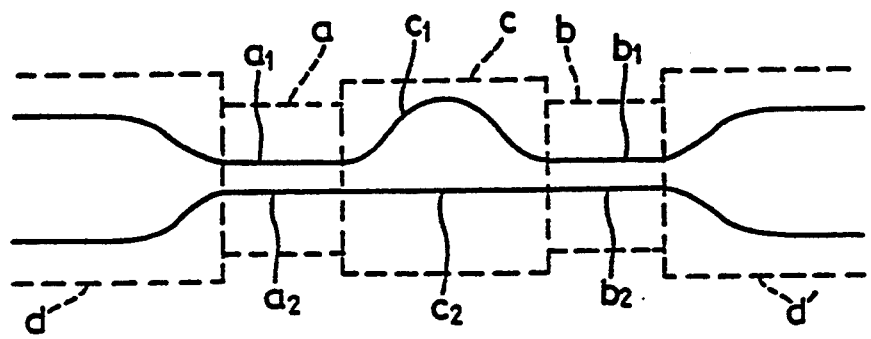
FIG. 2 is a schematic diagram showing a conventional waveguide type optical component which applies a Mach-Zehnder interferometer.

Referring to FIG. 2, the conventional waveguide type optical component, which applies a Mach-Zehnder interferometer and functions as a directional coupler, is equipped with an optical coupling section "a" comprising optical waveguides a1 and a2, an optical coupling section "b" comprising optical waveguides b1 and b2, and a phase-shifting section "c" which is provided between the two optical coupling sections "a" and "b" and which comprises a curved optical waveguide c1 and a linear optical waveguide c2. A lead section "d" is connected to the optical coupling section "a," and a lead section "d'" is connected to the optical coupling section "b." This optical component includes a first optical waveguide of the optical component, which includes optical waveguides a1, b1, and c1, and a second optical waveguide of the optical component, which includes optical waveguides a2, b2, and c2. The efficiency of the optical coupling between the first and second optical waveguides is kept almost constant in a certain range of light wavelength by setting the parameters of the coupling sections "a" and "b" and the phase-shifting section "c" to required values.

For instance, in the optical component of FIG. 2, the optical waveguides a1, a2, b1, b2, c1, and c2 are made of silica glass. Each optical waveguide is formed such that the width and height are 8 $\mu$m, and the difference in specific refractive index between the core and the clad is 0.25%. The length of the optical waveguides a1 and a2 is set to 1415 $\mu$m, and the length of the optical waveguides b1 and b2 is set to 920 $\mu$m. The pitch between the waveguides a1 and a2 is set to 13 $\mu$m, and the pitch between the waveguides b1 and b2 is set to 13 $\mu$m. Further, the path difference between the curved optical waveguide c1 and the linear optical waveguide c2 is set to 0.595 $\mu$m. In this case, according to the calculation based on the Marcatili method (the coupling at the lead sections "d" and "d'" is ignored), the coupling efficiency of the optical component of FIG. 2 is 19.5±2.1% when the wavelength is 1.3 to 1.65 ‖ m.

In the optical component of FIG. 2, when the radius of the curvature of the curved optical waveguide c1 is set to 50 mm, the length of the optical component excluding the lead sections "d" and "d'" is increased to approximately 6.4 mm. This means that the optical component of FIG. 2 has a drawback in that it is difficult to make the optical component smaller and to integrate the elements of the optical component.

Figure 3:
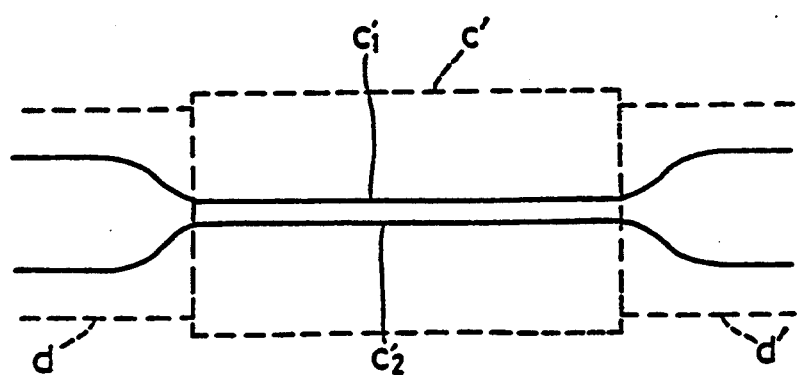
FIG. 3 is a schematic diagram showing another conventional waveguide type optical component consisting of optical waveguides which have different propagation constants.

Referring to FIG. 3, a conventional waveguide type optical component, which is different from the optical component of FIG. 2 and functions as a directional coupler, includes an optical coupling section "c'" consisting of two linear optical waveguides c'1 and c'2 which have different propagation constants. The optical coupling section "c'" is provided between lead sections "d" and "d'". The optical waveguides c'1 and c'2 are formed so that they have different heights or widths to furnish the optical waveguides c'1 and c'2 with different propagation constants.

For instance, In the optical component of FIG. 3, the optical waveguides c'1 and c'2 are made of silica glass, and each optical waveguide is formed so that its height is 8 $\mu$m and the difference in specific refractive index between the core and the clad is 0.25%. The width of the optical waveguide c'1 is set to 8.74 $\mu$m and that of the optical waveguide c'2 to 7.26 $\mu$m. The lengths of the optical waveguides c'1 and c'2 are set to 3030 $\mu$m, and the pitch between the waveguides c'1 and c'2 is set to 14 $\mu$m. In this case, according to the calculation based on the Marcatili method (the coupling at the lead sections "d" and "d'" is ignored), the coupling efficiency of the optical component of FIG. 3 is 19.7±7.0% when the wavelength is 1.3 to 1.65 $\mu$m.

In the optical component of FIG. 3, it is possible to reduce the length of the optical component excluding the lead sections "d" and "d'" to about 3.0 mm. However, there is a problem in that the flatness of the coupling efficiency in relation to changes in wavelength is deteriorated.

Figure 1:
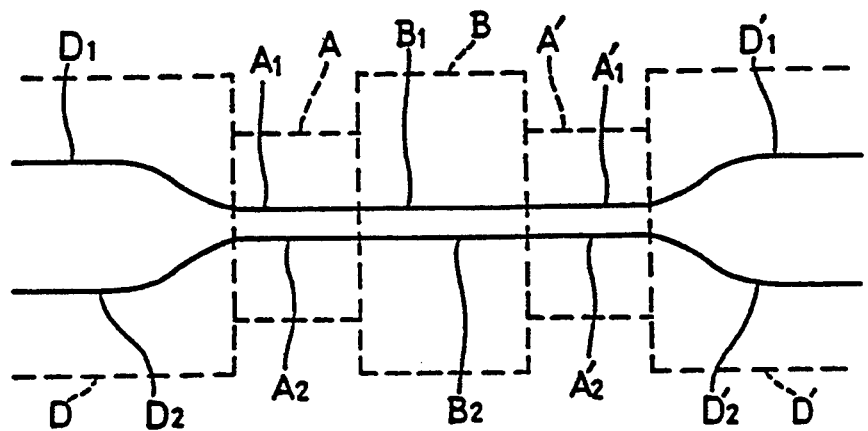
FIG. 1 is a schematic diagram showing a waveguide type optical component according to an embodiment of the present invention.

The following describes a waveguide type optical component according to the present invention with reference to FIG. 1.

The optical component of FIG. 1, which functions as a directional coupler, is provided with a first optical coupling section A, which comprises two optical waveguides A1 and A2 having the same propagation constant, a second optical coupling section B, which comprises two optical waveguides B1 and B2 having different propagation constants, and a third optical coupling section A', which comprises two optical waveguides A'1 and A'2 having the same propagation constant. Associated optical waveguides A1, B1; A2, B2 of the first and second optical coupling sections A, B are connected in series on one side of the second optical coupling section B, while associated optical waveguides B1, A'1; B2, A'2 of the second and third optical coupling sections B, A' are connected in series on the other side of the second optical coupling section B. The two optical waveguides A1, A2; B1. B2; A'1, A'2 of each of the first, second, and third optical coupling sections A, B, and A' are linearly formed and arranged in parallel with each other so as to achieve evanescent-field coupling. Further, connected to the outer ends of the optical waveguides A1 and A2 of the first optical coupling section A are optical waveguides D1 and D2 of a first lead section D, and connected to the outer ends of the optical waveguides A'1 and A'2 of the third optical coupling section A' are optical waveguides D'1 and D'2 of a second lead section D'. Each of the optical waveguides D1, D2, D'1, and D'2 consists of a curved optical waveguide, to which the outer end of the optical waveguide A1, A2, A'1 or A'2 is connected, and a linear optical waveguide to which the curved optical waveguide is connected. Corresponding two of these linear optical waveguides extend in parallel with each other at a distant.

To manufacture the optical component of FIG. 1, a bottom clad layer, which is usually about 20 μm thick, and a core layer of about 8 μm thick are first formed on a silicon substrate in the mentioned order, using the flame hydrolysis deposition method, vacuum evaporation method, plasma CVD method, sol-gel method or the like. When producing the core layer, a prescribed amount of $TiO_2$ or $GeO_2$ is added so that the core layer exhibits a higher refractive index than that of the bottom clad layer and a top clad layer to be discussed later, i.e., the difference in specific refractive index between the core layer and the top and bottom clad layers becomes approximately 0.25%. Then, a prescribed pattern of optical waveguide is formed by removing unnecessary portions from the core layer by applying the photolithography method which uses the reactive ion etching process. Further, the top clad layer, which has the same refractive index as that of the bottom clad layer, is formed on the core layer, and the optical waveguide pattern is buried in the top clad layer.

Various conventional methods other than the manufacturing method described above can be applied to manufacture the optical component. Likewise, the structure of the optical waveguide is not limited to the embedded waveguide described above, but various other structures including ridge optical waveguides and diffusion optical waveguides may be adopted. Further, the material used for the optical waveguide is not limited to silica, but various other materials such as multi-component glass, ferroeleetrie materials, compound semiconductors, and high polymer materials may also be used.

Diverse methods are available to furnish the optical waveguides B1 and B2 of the second optical coupling section B with different propagation constants. For example, the optical waveguides B1 and B2 are composed of the same type of silica glass but they are configured to have different widths or heights. Alternatively, the optical waveguides B1 and B2 are furnished with different refractive indices to give the optical waveguides B1 and B2 different propagation constants.

To be more specific, In the case of a silica waveguide having a core with Ge added, it is possible to increase the refractive index of the core by exposing one of the optical waveguides of an optical coupling section to ultraviolet rays. According to 140/OFC '92/Wednesday Poster, Paper No. WK1, when ultraviolet beams of 100 mJ/cm2 per pulse are radiated from an excimer laser using KrF (wavelength: 249 nm) toward the core for 50 pulses, the refractive index of the silica core containing Ge Increases about $2 \times 10^{-6}$. In the case of an optical waveguide composed of lithium niobate crystal, the refractive index of the optical waveguide significantly changes when voltage of a specified value is applied to the optical waveguide. Therefore, the optical waveguides B1 and B2 may be composed of lithium niobate crystal, and voltage may be applied to either the optical waveguide B1 or B2. When semiconductor materials are used for the optical waveguides B1 and B2, currents of a specified value are applied to one of the optical waveguides B1 or B2 to decrease the refractive index of that optical waveguide. Further, when the core is located near the surface of an optical waveguide as in the ridge type optical waveguide, a different material is loaded on the optical waveguide to change the equivalent refractive index of that portion.

The following presents brief explanation of the operation of the optical component shown in FIG. 1. For example, when an optical signal enters through the optical waveguide D1 of the first lead section D, optical coupling takes place among the optical waveguides A1, A2; B1, B2; and A'1, A'2 of the optical coupling sections A, B, and A', and a phase difference is given between the optical signal going through the optical waveguide B1 and the optical signal going through the optical waveguide B2 in the second optical coupling section B. In other words, the functions of the coupling sections "a" and "b" in the directional coupler (optical component) of FIG. 2 are effected primarily by the first and third optical coupling sections A and A', and the function of the phase-shifting section "c" in the optical component of FIG. 2 is effected by the second optical coupling section B. The second optical coupling section B also partially complements the functions of the coupling sections A and A'. The optical signal entering through the optical waveguide D1 of the first lead section D goes out from the two optical waveguides D'1 and D'2 of the second lead section D'.

If the intensities of the light going out from the waveguides D1' and D2' are taken as I1 and I2 when the light enters through the waveguide D1, then the coupling efficiency $\eta$ of the whole optical component is $\eta = I2/(I1+I2)$. Hence, for instance, if the coupling efficiency $\eta$ at a given wavelength is 20%, when light of an intensity of 1 μW enters through the waveguide D1, then the intensities of the light going out from the waveguides D1' and D2' will be 800 nW and 200 nW, respectively, if the losses in the waveguides are ignored.

Embodiment 1

A waveguide type optical component, which has the structure shown in FIG. 1, was produced by using silica glass for all optical waveguides D1, D2, A1, A2, B1, B2, A'1, A'2, D'1, and D'2 including the optical waveguides of the lead sections D and D' so that the difference in specific refractive index between the core and the clad was 0.25%. At this time, the heights of the optical waveguides A1, A2, B1, B2, A'1, and A'2 were set to 8 μm, the widths of the optical waveguides A1, A2, A'1, and A'2 were set to 8 μm, the width of the optical waveguide B1 was set to 7 μm, and the width of the optical waveguide B2 was set to 9 μm. Further, the lengths of the first through third optical coupling sections A, B, and A' were set to 1500 μm, 1850 μm, and 520 μm, respectively. Furthermore, the curvature radii of the curved optical waveguides of the lead sections D and D' were set to 50 mm.

According to the calculation based on the Marcatili method (the coupling at the lead sections D and D' is ignored), the coupling efficiency of the optical component thus fabricated is 20.0±1.9% in a wavelength range of 1.3 to 1.65 μm.

Embodiment 2

In the configuration shown in FIG. 1, if the curvature radii of the curved optical waveguides of the lead sections D and D' are set to 50 mm, then the coupling amounts at the lead sections correspond to the coupling amounts in the portions of the length of 0.3 to 0.4 mm of the first and third coupling sections of the directional coupler. Hence, taking the optical coupling at the lead sections D and D' into account, an optical component was produced with the lengths of the first and third optical coupling sections A and A' set to smaller lengths, 1150 μm and 170 μm, respectively, and the remaining configuration being identical to the configuration of Embodiment 1.

The optical component thus produced was approximately 3.2 mm long (excluding the lengths of the lead sections D and D'), and the calculated value of the coupling efficiency of the optical component at a wavelength of 1.3 to 1.65 μm was 21±2%.

Embodiment 3

An optical component was produced with the lengths of the first through third optical coupling sections A, B, and A' set to 2440 μm, 1450 μm and 600 μm, respectively, and the remaining configuration being identical to the configuration of Embodiment 1. The calculated value of the coupling efficiency of the optical component thus produced was 50±3.8% at a wavelength of 1.3 to 1.65 μm.

Embodiment 4

Taking the optical coupling at the lead sections D and D' into account, an optical component was produced with the lengths of the first and third optical coupling sections A and A' set to reduced lengths, 2090 μm and 250 μm, respectively, and the remaining configuration being identical to the configuration of Embodiment 3. The optical component thus produced was approximately 3.8 mm long (excluding the lengths of the lead sections D and D'), and the calculated value of the coupling efficiency of the optical component at a wavelength of 1.3 to 1.65 μm was 48±4%.

The present Invention is not limited to the Embodiments 1 through 4 described above, but it is available in various other modifications.

For instance, in the embodiments described above, the optical component was comprised of the first through third optical coupling sections A, B, and A', but the optical component may alternatively be composed of the first optical coupling section A or the third optical coupling section A' and the second optical coupling section B. In this case, the outer ends of the optical waveguides B1 and B2 constituting the second optical coupling section B are connected to the two curved optical waveguides constituting the lead sections D or D'. In addition, the values of the lengths of the optical coupling sections, the heights and widths of the optical waveguides, and the curvature radii of the curved optical waveguides of the lead sections in the embodiments described above are examples, and therefore, the values are not limited to those but diverse other values may be used.

What is claimed is:

1. In a waveguide type optical component having optical coupling sections, said optical coupling sections comprising only first and second coupling sections, the improvement wherein:

said first optical coupling section includes two optical waveguides having a same propagation constant; and said second optical coupling section includes two optical waveguides having respective different propagation constants, each of the optical waveguides of said first optical coupling section and a corresponding one of the two optical waveguides of said second optical coupling section being connected in series with each other, and the two optical waveguides of each of said first and second optical coupling sections being linearly configured and disposed so as to achieve an evanescent-field coupling therebetween.

2. The waveguide type optical component according to claim 1, wherein the optical waveguides of said first and second optical coupling sections are made of silica.

3. The waveguide type optical component according to claim 1, wherein the two optical waveguides of said second optical coupling section are made of materials which have different refractive indices.

4. The waveguide type optical component according to claim 2, wherein the two optical waveguides of said second optical coupling section have at least different heights.

5. A waveguide type optical component, comprising:

a first optical coupling section including two optical waveguides having a same propagation constant;

a second optical coupling section including two optical waveguides having respective different propagation constants, each of the optical waveguides of said first optical coupling section and a corresponding one of the two optical waveguides of said second optical coupling section being connected in series with each other, the two optical waveguides of each of said first and second optical coupling sections being linearly configured and disposed so as to achieve an evanescent-field coupling therebetween; and a third optical coupling section including two optical waveguides having a same propagation constant;

said first and third coupling sections having respective coupling section lengths which are different from each other;

and wherein:

each of the optical waveguides of said first optical coupling section and a corresponding one of the optical waveguides of said second optical coupling section are connected in series with each other on one side of said second optical coupling section; and each of the optical waveguides of said second optical coupling section and a corresponding one of the optical waveguides of said third optical coupling section are connected in series with each other on another side of said second optical coupling section.

6. The waveguide type optical component according to claim 5, wherein the optical waveguides of said first, second and third optical coupling sections are made of silica.

7. The waveguide type optical component according to claim 2, wherein the two optical waveguides of said second optical coupling section have at least different widths.

8. The waveguide type optical component according to claim 6, wherein the two optical waveguides of said second optical coupling section have at least different widths.

9. The waveguide type optical component according to claim 6, wherein the two optical waveguides of said second optical coupling section have at least different heights.

* * * * *